March 29, 1960   J. A. ISAACSON   2,930,460
CLUTCH AND ANTI-CREEP BRAKE DEVICE
Filed Nov. 18, 1957   4 Sheets-Sheet 1

Inventor:
Jerrold A. Isaacson
Paul O. Pippel
Atty.

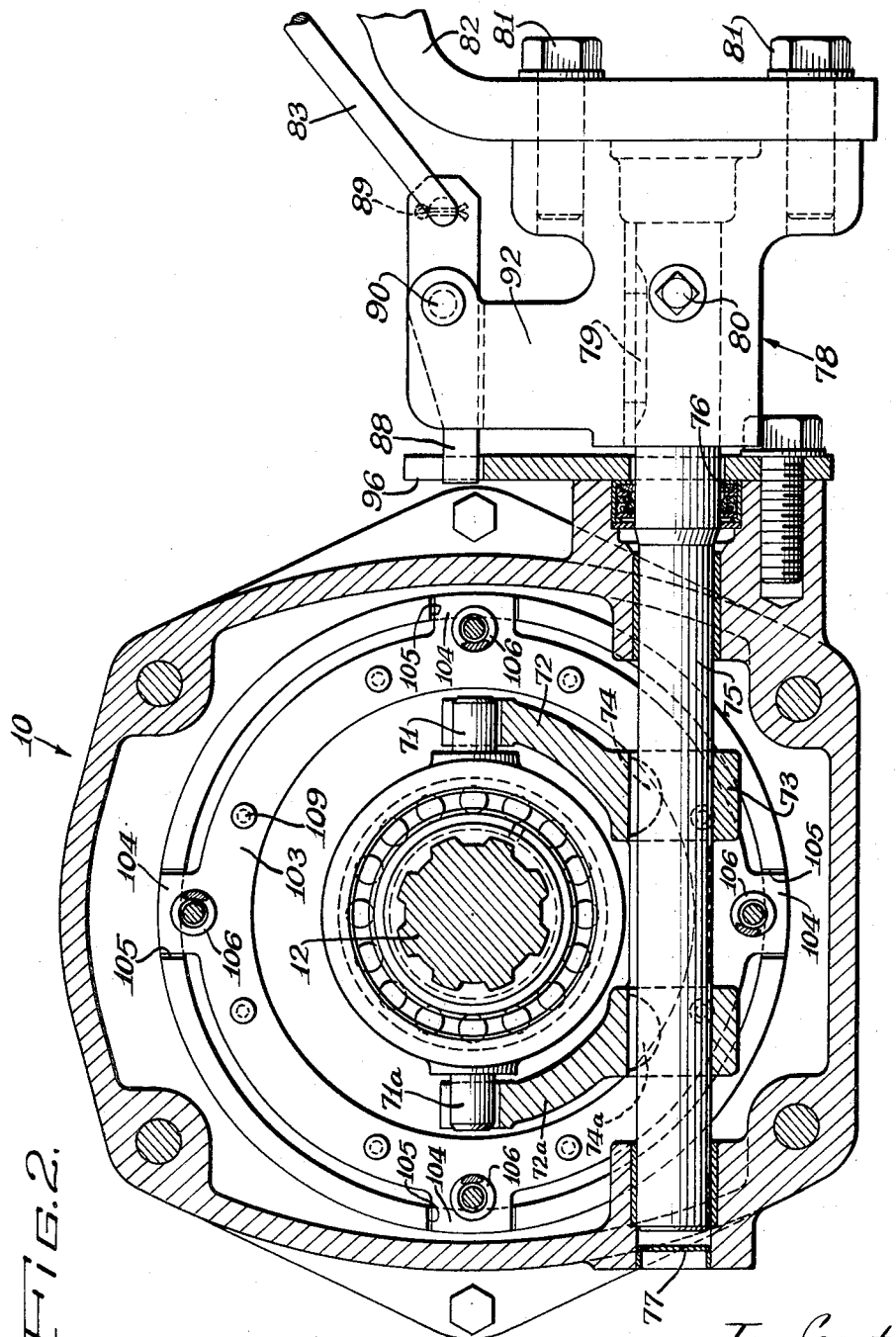

March 29, 1960
J. A. ISAACSON
2,930,460
CLUTCH AND ANTI-CREEP BRAKE DEVICE
Filed Nov. 18, 1957
4 Sheets-Sheet 3
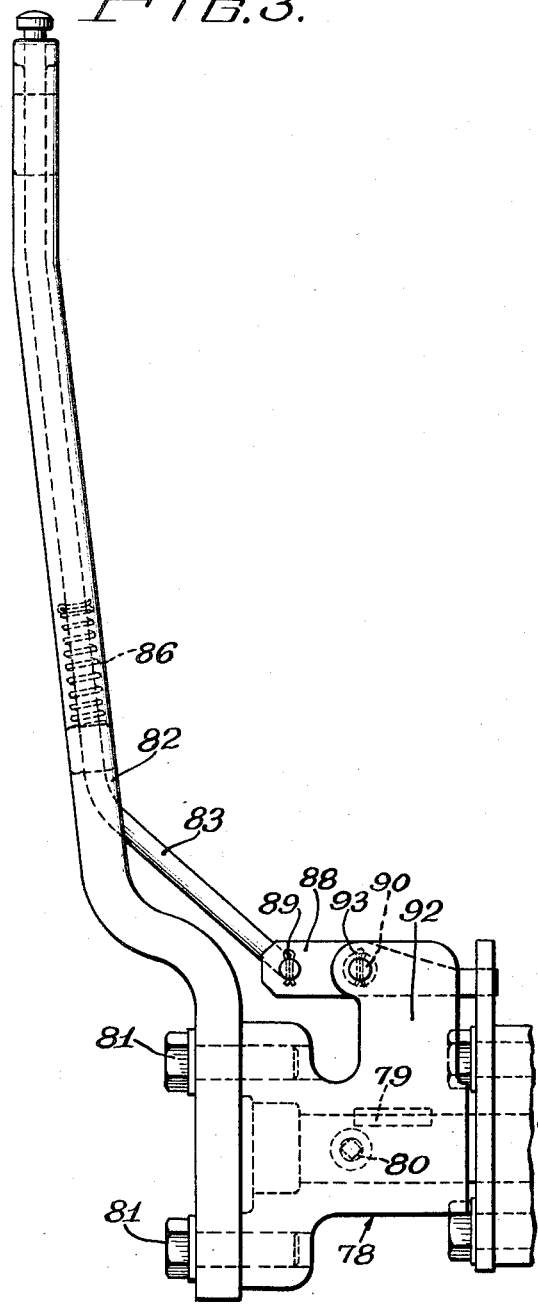
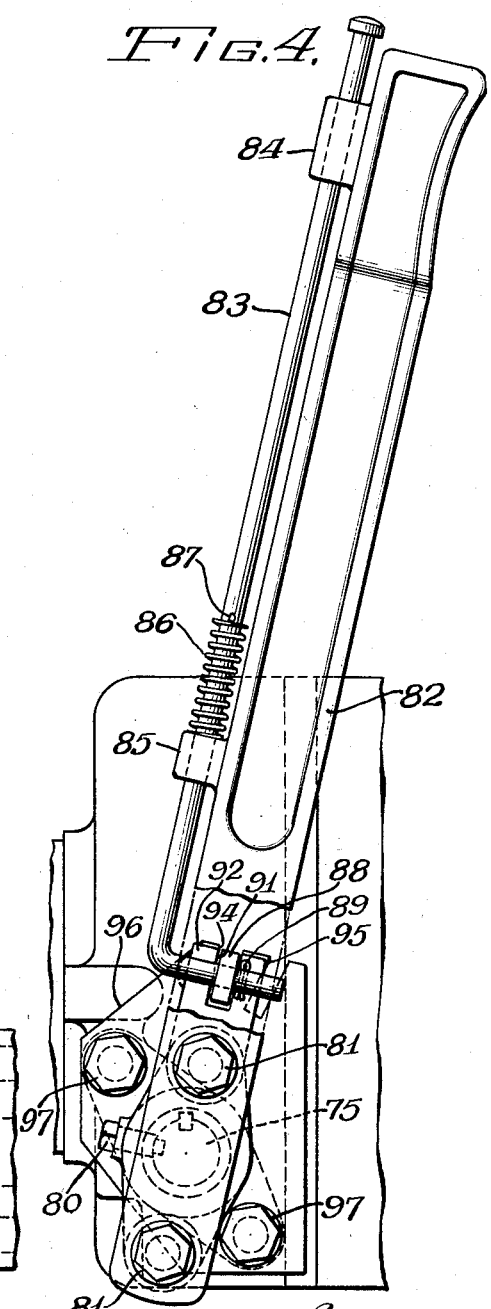
Inventor:
Jerrold A. Isaacson
Paul O. Pippel
Atty.

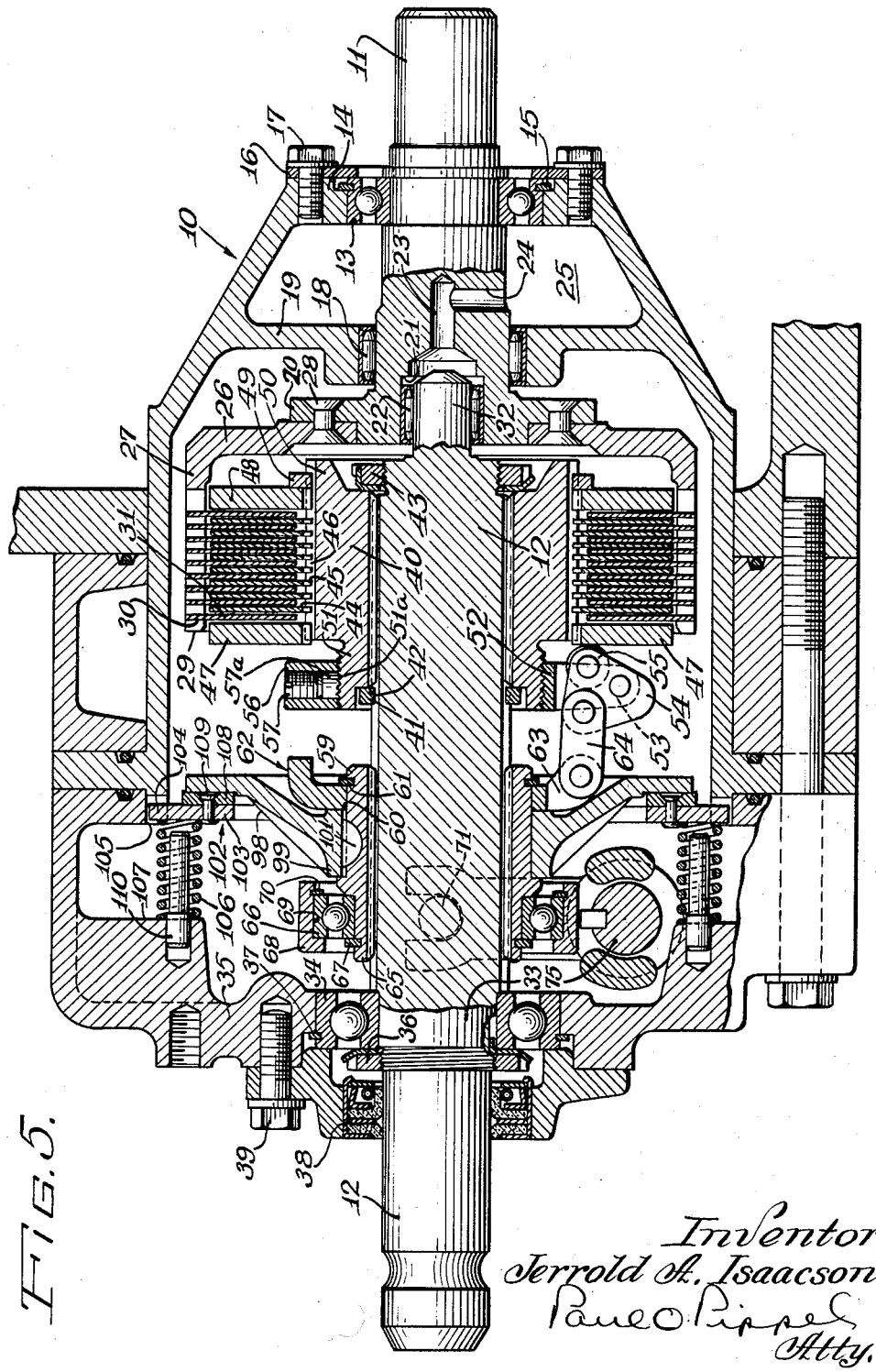

United States Patent Office 2,930,460
Patented Mar. 29, 1960

2,930,460

CLUTCH AND ANTI-CREEP BRAKE DEVICE

Jerrold A. Isaacson, Lombard, Ill., assignor to International Harvester Company, Chicago, Ill., a corporation of New Jersey Application November 18, 1957, Serial No. 697,130

6 Claims. (Cl. 192—18)

This invention relates to clutching mechanisms but is more specifically directed to a combination comprising alternatively operable clutch and anti-creep brake mechanisms.

In the modern farm or industrial tractor vehicle there is customarily provided a power take-off mechanism, driven by the main power plant of the vehicle and operable independently of the motion or movement of the vehicle over the ground, for operating or driving auxiliary equipment. This power take-off device is frequently arranged so as to have the drive therefor pass around or by-pass the driven element of the main clutch of the vehicle so that said drive is always available when the power plant is in operation regardless of whether the main clutch is engaged or disengaged. This being the case, the power take-off would operate continuously unless some additional disengageable means was provided to discontinue the operation thereof, except when specifically desired.

Usually to accomplish the selective disengagement of the power take-off there is provided a clutching mechanism, disposed at the rear of the tractor vehicle in the vicinity of the driven shaft of the power take-off, that is manually engageable and disengageable by the vehicle operator. However, when this power take-off clutch is disengaged there is a tendency for the driven shaft thereof to continue rotation because of the drag in the clutch, which drag, of course, is considerably increased when a wet-type of clutch is used. In order to stop such rotation or creep, as it is commonly termed, there must be provided some braking means which becomes effective upon disengagement of this clutch, and it is to an improved device of the character that provides such alternatively clutch and braking action that the present invention is directed.

The principal object, therefore, is to provide an improved combination clutch and brake mechanism for connecting a shaft or other rotatable machine element to a rotating member from which it receives drive, and for braking such shaft or driven element upon release of its clutch connection with the driving member.

Another object is to provide an improved clutch and braking means for an independently operated power take-off mechanism.

The foregoing and other objects and advantages are attained by the present invention, various novel features of which will be apparent from the description herein and the accompanying drawing disclosing a preferred embodiment of the invention, and will be more particularly pointed out in the appended claims.

Fig. 2 is a vertical sectional view of the device taken on line 2—2 of Fig. 1, and showing portions of the control elements therefor in elevation;

Fig. 3 is an opposite end elevational view, at reduced scale, showing a portion only of the control elements of the mechanism;

Fig. 4 is a front elevational view, at reduced scale, of the operating handle and latching portion of the mechanism, with a portion thereof shown broken away to better illustrate the features of the device; and Fig. 5 is a view similar to Fig. 1 but showing the clutch in a disengaged or released position while the brake is in an engaged or braking position.

Figure 1:
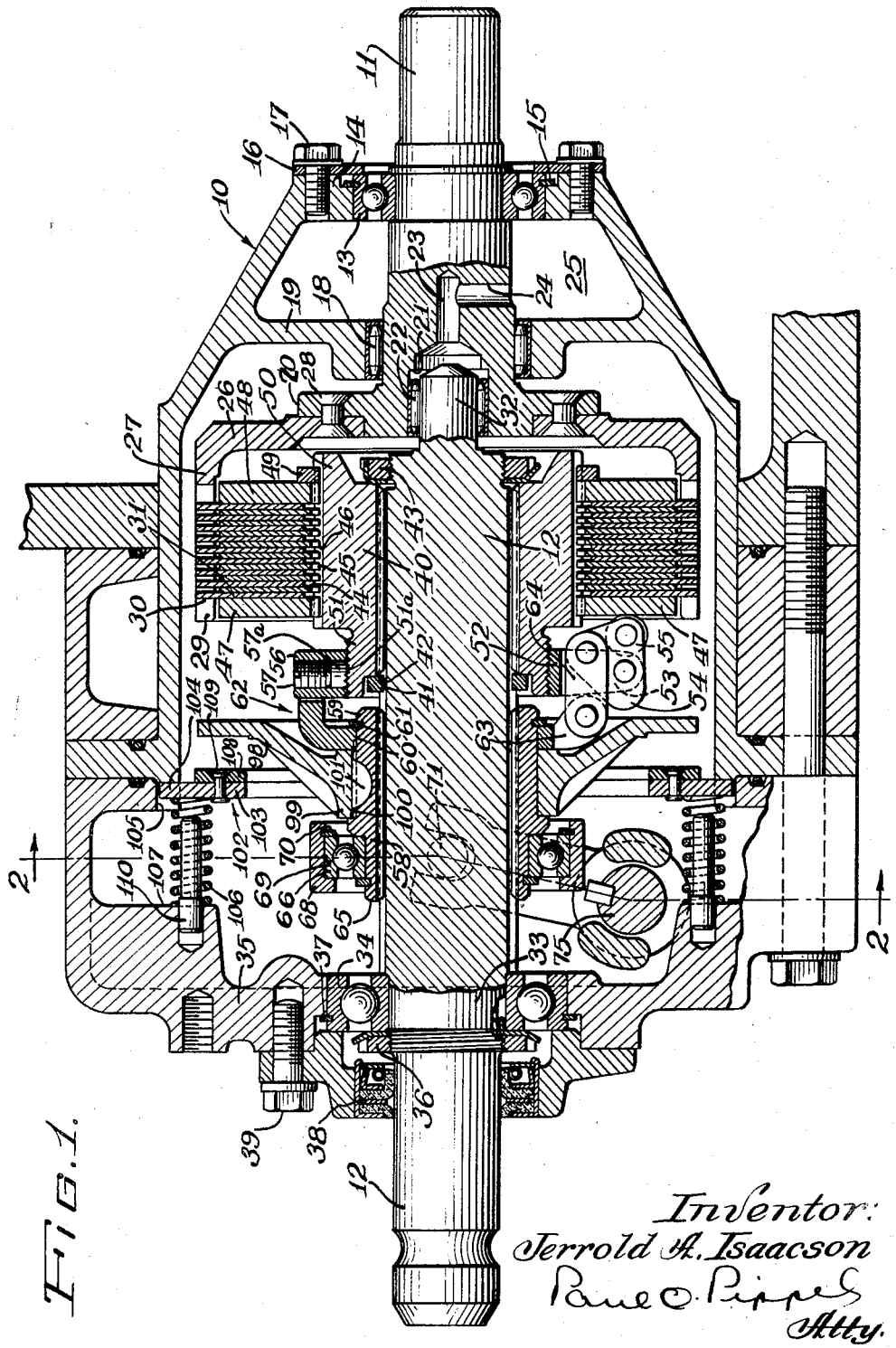
Fig. 1 is a vertically and longitudinally extending view through the proposed clutch and brake mechanism, with portions thereof being shown in section, and showing the clutch in an engaged position while the brake is disengaged or released.

Referring now to the drawings, where there is illustrated one preferred embodiment of the present invention, it will be noted that the proposed mechanism is shown enclosed in a support-like casing or housing 10 from which extends an input or driving shaft 11 and an output or driven shaft 12. The driving shaft 11 is journalled by a bearing 13 that is mounted in an end wall 14 of said housing, and said bearing may be fixedly positioned within said wall by conventional means, such as the snap ring 15 and the cover plate 16, the latter of which, in turn, is secured to the housing by bolts 17. The driving shaft 11 is, additionally, journalled by a needle bearing 18 mounted in an opening in a transverse wall member 19 of said housing, while affixed to the inner end of said shaft is a radial flange portion 20. An axial recess 21 inwardly extending into the inner end of shaft 11 is fashioned to receive a pilot needle bearing 22 for purposes which will presently be more fully understood. Interconnecting passages 23 and 24 provide fluid communication means between the end of the recess 21 and a chamber 25 formed in the housing 10 between the walls 14 and 19 thereof.

A clutch driving bell or cup 26 having an axially extending cylindrical portion 27 thereon may be securely affixed to the flange 20 by any suitable conventional securing means, such as the rivets shown at 28. Suitable axially extending slotted keyways 29 in the cylindrical portion 27, of the cup 26, are provided, in accordance with conventional practice, for receiving circumferentially spaced radial key-like extensions 30 formed around the edges of each of a plurality of clutch discs or plates 31.

Positioned for rotation within the pilot bearing 22, in axial recess 21, is the reduced-section end portion 32 of the driven or output shaft 12, the opposite end portion 33 of which is journalled in a bearing 34 mounted in an opposite end wall 35 of the housing 10. A conventional lock nut and washer assembly 36 mounted on the driven shaft 33 and a conventional snap ring 37 seated in the bearing race cooperate to affix the bearing 34 in position against axial displacement, while an oil seal assembly 38 may be positioned around said output shaft and then secured to the end wall 35, by suitable fastening means such as the bolts 39.

A sleeve-like collar or clutch hub member 40 is splined or otherwise suitably secured onto the shaft 33 and fixedly positioned against axial movement thereon by means of a split contractile ring 41, seated in an annular groove 42 in said shaft, that abuts one end of the hub, and by a lock nut and washer assembly 43 on said shaft that abuts the other end of said hub. A plurality of clutch discs or plates 44 having keyway slots 45 therein are slidably mounted on splines 46 in the outer periphery of the hub 40. It will be understood, of course, that the clutch discs 44 are alternately disposed or interleaved with respect to the clutch discs 31 so that each face of the discs in one set of discs is engaged by the face of an adjacent disc in the other set in accordance with conventional construction for a clutch of this type. A thrust plate 47 having a keyway slot therein is slidably splined on the hub 40 near one end thereof, while a thrust plate 48 closely abuts a snap ring 49 seated against a rim-like extension or collar 50 formed on said hub proximate the other end thereof thus serving to contain the clutch discs 31 and 44 and also providing suitable thrust abutment means therefor.

One end of the hub 40 is formed with a reduced-section portion 51 upon which is suitably mounted, as by the mating screw threads 51a, a collar-like member 52 that is fashioned with a plurality of radially extending studs or posts 53 (only one of which is shown) which pivotally support toggle-like actuator linkage for effecting engagement of the multiple discs of the clutch. Pivotally mounted on the radially outward end of each of the studs 53 is a triangular-shaped toggle link member 54 and pivotally mounted at one corner of the toggle link is a roller 55 which is disposed for engaging the thrust plate 47 and causing it to press firmly against the multiple discs of the clutch. Interspersed between the studs 53, circumferentially around the collar 52, and fixedly secured to said collar are a plurality of bosses 56 which are threaded to receive set screws 57 and setting blocks 57a that may be cooperatively utilized to axially position the collar 52 and thus provide means for adjustment of the clutch to compensate for wear, and the like, in the elements thereof. It will be understood, of course, that to effect such an adjustment the screws 57 are first loosened, then the collar 52 is rotated on the threads 51a to a desired position, after which the blocks 57a are clamped tightly against said threads by the screws 57 to fixedly position the collar.

A reciprocating collar or sleeve 58 is mounted for slidable axial movement, as by splining or the like, on the driven shaft 12 and one end thereof is provided with a reduced-section portion 59 that forms a shoulder 60 proximate said end. Positioned over the reduced end portion 59 and pressed against the shoulder 60 by means of a snap ring 61, seated in an annular groove in said reduced end portion, is a linkage actuator member 62. This actuator is fashioned with a plurality of arms, such as shown at 63, upon the outer end of each arm of which is pivotally mounted a flat link 64 whose opposite end, in turn, is pivotally connected to one corner portion of the triangular-shaped toggle link 54. Hence, it will be apparent, that when the reciprocating sleeve 58 is moved to the right (as viewed in Figs. 1 and 5) the flat link 64 will cause the toggle link 54 to rotate clockwise about its pivotal connection with stud 52 and swing the roller 55 into tight fitting engagement or pressure contact with the thrust plate 47, while movement of said sleeve in the opposite direction will rotate the roller counterclockwise and effect disengagement of the roller from pressure contact with said thrust plate.

The opposite end of sleeve 58 is formed with a reduced-section portion 65 that has fitted thereover a bearing assembly 66, while a snap ring 67, seated in an annular groove in said reduced-section portion, serves to fixedly position said bearing against axial displacement relative to said sleeve. Circumscribing the outer race of bearing assembly 66 is a collar 68 having an annular recess 69 in the interior thereof that receives said bearing race and a snap ring 70, seated in an annular recess in said collar, cooperates with the radially inwardly extending shoulder portion of recess 69 to position the said bearing assembly against axial displacement with respect to the collar 68. A pair of oppositely extending medially disposed trunnions 71—71a (Fig. 2) extending radially outwardly from the collar 68 are provided to receive the bifurcated arms 72—72a, respectively, of a clutch fork or yoke 73 which, in turn, is mounted on and secured, as by the keys 74—74a, to a rockshaft 75 that is suitably journalled for rotation in the walls of the casing 10. An oil seal assembly 76 is provided proximate an end of said rockshaft that extends outwardly beyond said casing, while a plug 77 may be used to suitably close the casing wall opening at the opposite end of said shaft.

The outwardly extending end of rockshaft 75 has a hub-like member 78 mounted thereon and said hub is secured against rotative movement relative to the shaft by the key shown at 79, while a cap screw 80 threadedly mounted in said hub serves to removably affix the hub against axial movement on said shaft. Removably affixed to the outer vertical face or end of the hub 78, by suitable securing means such as the bolts 81, is an operating lever or handle member 82 whereby the operator may manually manipulate the reciprocating sleeve 58. Disposed adjacent said operating handle is a push rod release member 83 which is slidably positioned in spaced bearing-like supports 84 and 85 (Fig. 4) that may be formed as part of the handle, or, if desired, separately fashioned and then suitably secured to the handle. A coil spring 86 is positioned around the rod 83 and disposed so that one end thereof seats against the support 85 while the opposite end abuts a transverse pin 87 fixedly mounted in said rod. The lower end portion of push rod 83 is bent over and pivotally mounted in one end of a detent latching lever member 88 and is conditioned against accidental removal therefrom by suitable means, such as the cotter pin 89. Said lever, in turn, is pivotally mounted by means of a headed pin 90 in a slot-like recess or opening 91 provided in an extended arm portion 92 of the hub 78, while a cotter pin 93 therein serves to prevent accidental removal of said pin. The opposite or inwardly extending end of latching detent 88, which may be tapered or shaped as shown in Figures 2 and 3 is disposed for seating or latching engagement in one of two slots 94 or 95 formed in a latching or quadrant plate 96 that, in turn, is suitably secured, as by the bolts 97, to the casing or housing 10. As thus arranged, it will be seen that by pressing the push rod 83, against the reaction of spring 86, the latching detent 88 will be rotated or raised out of either of the slots 94 or 95 thus freeing the handle 82 so as to permit it to be rotated from one locked or latching position to the other.

A generally dish-shaped pressure plate 98 having a hub portion 99 centrally thereof is mounted on the reciprocating sleeve 58 and is adapted for rotative and axial movement therewith. The plate 98 at one axial end of its hub portion 99 closely abuts one face of the linkage actuator 62, while at the opposite axial end thereof it fits snugly against an annular shoulder 100 provided in the sleeve's periphery and thus said plate is conditioned against axial displacement relative to said sleeve. A key, such as shown at 101, is provided to interlock the plate 98 with the sleeve 58 so as to insure that said plate will rotate with said sleeve. Positioned for frictional engagement with an outer edge portion of one face of the pressure plate 98 is a brake plate, indicated generally by the reference numeral 102.

The brake plate 102 may be fashioned in the form of a flat ring 103 having radially outwardly extending therefrom a plurality of circumferentially spaced mounting ears or lugs 104 that are slidably received in respective cooperating axially extending slots 105 fashioned in the housing 10. Resilient means, in the form of a plurality of circumferentially spaced compressible coil springs 106, are reactively disposed between one face of brake plate 102 and the inwardly extending shoulder portion 107 of the housing 10 and operate to urge said brake plate into tight fitting engagement or frictional contact with the pressure plate 98. A ring of conventional friction facing or lining material 108 is affixed to the face of the brake plate 102 by any suitable securing means, such, for instance, as by the rivets shown at 109. Axially extending guide pins 110 fixedly secured in openings in the shoulder portion 107 are disposed one for each spring member 106 and are arranged so as to extend centrally therethrough and thus guide as well as aid in supporting said spring members.

The operation of the present invention originates with the operator who manipulates the handle member 82 according to the condition of engagement or disengagement desired. Assume first the condition wherein the clutch is disengaged and the brake is engaged. In this instance, the handle 82 will have been rotated counterclockwise from the position shown in Figure 1, and the latching lever 88 will be seated in the slot 94 thus fixedly securing the pressure plate 98 tightly pressed in frictional contact against the brake plate 102 after overcoming the reaction of springs 106 which, of course, will be compressed and the various elements of the mechanism will assume the relative positions generally indicated in Figures 4 and 5. In order to change from this position the operator first presses the push rod release 83 to raise the latching lever 88 out of the interlocking slot 94 thereby freeing the handle 82 for rotative clockwise movement with the rockshaft 75 following such movement. Rotation of said rockshaft incident to movement of handle 82 causes the yoke 73, which is affixed thereto, to carry with it and this movement of the yoke slides the reciprocating sleeve 58 to the right, as viewed in Figures 1 and 5, whereupon the pressure plate 98 is disengaged from pressure contact with the brake plate 102. Upon longitudinal axial movement of the sleeve 58, to the right, the linkage actuator 62, which moves therewith, forces the link 64 to effect rotation of the triangular toggle 54 about its pivotal axis on stud 53 carrying with it the roller 55 which is thus brought into engaging contact relation with the thrust plate 47 of the clutch. As the thrust plate 47 is axially displaced by the pressure of roller 55 thereon the alternately disposed clutch discs 31 and 44 are brought into a closely engaging relationship thus establishing a driving connection between the driving input shaft 11 and the driven output shaft 12. As the link 64 rotates the toggle link 54 the pivotal axis of the roller 55 rotates away from the axis of rotation of the output shaft 12 until finally it goes beyond a horizontal plane through the axis of rotation of said toggle link, on the pivotal mounting stud 53, thus effecting an over-centering snap action which operates to snap the roller into a lock-up relation against axial displacement with respect to the thrust plate 47. When this condition has been attained the clutch discs are held pressed together in a tightly engaging relationship and the operator can then release the handle 82 without causing any disengagement of the clutch. However, in order to further stabilize the mechanism and minimize rattle and vibration when such mechanism is incorporated in a vehicle, the latching lever 88 is positioned so that when the clutch is engaged said latching lever is seated in a slot 95 in the quadrant latch plate 96 thereby providing an additional safeguard for maintaining the clutch engaged. It will be apparent that rotation of the operating handle 82 in the opposite direction will effect disengagement of the clutch discs and subsequently cause the pressure plate 98 to frictionally engage the brake plate lining 108, thereby providing braking means between the driven shaft 12 and the casing 10 which will stop any rotation of said shaft after disengagement of the clutch.

While only one form of the invention has been shown, it will be obvious to those skilled in the art that it is not so limited, but is susceptible of various changes and modifications without departing from the spirit thereof, and it is desired, therefore, that only such limitations shall be placed thereon as are specifically set forth in the appended claims.

What is claimed is:

1. A combined clutch and brake mechanism comprising, in combination: a housing; a driving shaft journalled on said housing; a driven shaft journalled on said housing and axially aligned with said driving shaft; clutch means between said shafts and engageable for drivingly connecting the driving shaft to the driven shaft; brake means separate from said clutch means and engageable to restrict the rotation of said driven shaft when said clutch is disengaged, and including an engageable face plate member supported for slidable axial movement within said housing and an engaging pressure member mounted for rotation with said driven shaft within said housing; resilient means interposed between said face plate and said housing and in engaging relationship with both thereof and axially reactive against one face of said face plate to oppose the force of said pressure member when engaged therewith; clutch actuating means for engaging and disengaging said clutch; manually operable operating means mounted on said housing and connected to said brake engaging pressure member and to said clutch actuating means; said operating means being selectively operable in one position for effecting engagement of the clutch and for disengaging said pressure member of the brake means from said face plate and in another for effecting disengagement of the clutch and causing said brake means pressure member to engage said face plate against the opposing reaction of said resilient means thereagainst.

2. A combined clutch and brake mechanism comprising, in combination: a housing, a driving shaft journalled on said housing; a driven shaft journalled on said housing and axially aligned with said driving shaft; multiple discs clutch means between said shafts and engageable for drivingly connecting the driving shaft to the driven shaft; clutch actuating means mounted for rotation with said driven shaft and operable to effect the engagement and disengagement of said clutch means; a radially extending ring-like member supported within said housing for slidable movement axially relative to said shafts; a plurality of peripherally spaced resilient means reactively disposed between one face of said ring-like member and said housing and in engaging relationship with both thereof and operative to permit said ring-like member to move axially a limited amount when an axially extending force is applied against an opposite face thereof; a radially extending plate member separate from said multiple discs clutch means and mounted for rotation with said driven shaft and disposed for axial movement into an engaging relation with the opposite face of said ring-like member to provide braking means between said driven shaft and said housing; manually operable operating means mounted on said housing and connected to said plate member and to said clutch actuating means, and selectively operable in one position for effecting engagement of the clutch and for disengaging said plate member from said ring-like member and in another position for effecting disengagement of the clutch and causing said plate member to closely engage said ring-like member against the opposing reaction of said resilient means so as to prevent rotation of said driven shaft.

3. A combined clutch and brake mechanism comprising, a combination: a support; a driving shaft journalled on said support; a driven shaft journalled on said support and axially aligned with said driving shaft; multiple discs clutch means between said shafts and engageable for drivingly connecting the driving shaft to the driven shaft; clutch throwout mechanism connected to said clutch means and mounted on said driven shaft for rotation therewith and for slidable movement therealong, and operable to effect the engagement and disengagement of said clutch means; a ring-like member circumscribing said driven shaft and supported by said support for slidable movement axially relative to said driven shaft; resilient means axially disposed between said ring-like member and said housing and in engaging relationship with both thereof and reactive for imposing a biasing force on said ring-like member for urging said member axially toward said clutch means; a radially extending pressure member separate from said multiple discs clutch means and mounted on said clutch throwout mechanism for axial and rotative movement with said mechanism and engageable with said ring-like member to provide a brake between said driven shaft and said support; operating means carried by said support and connected to said clutch throwout mechanism and selectively operable in one position for engaging the clutch means and disengaging the said pressure member of the brake from said ring-like member and in another position for disengaging the clutch means and causing the brake pressure member to tightly engage said ring-like member against an opposing biasing force imposed thereon by said resilient means.

4. A combined clutch and brake mechanism comprising, in combination: a support; a driving shaft journalled on said support; a driven shaft journalled on said support and axially aligned with said driving shaft; multiple discs clutch means between said shafts and engageable for drivingly connecting the driving shaft to the driven shaft; clutch throwout mechanism mounted on said driven shaft for rotation therewith and for slidable movement axially therealong; actuator linkage supported in part by and connected with said clutch throwout mechanism and engageable with said clutch means, and operable upon motivation by said clutch throwout mechanism for effecting the engagement and disengagement of said clutch means; said actuator linkage including interlocking means fashioned so that when said linkage is operated to position the clutch means into an engaged position said clutch means remains locked in such engaged position until released by operation of the interlocking means of said actuator linkage; a radially extending brake plate member having friction facing material on one face only thereof and circumscribing said driven shaft and carried by said support for slidable movement axially relative to said driving and driven shafts; resilient means including a plurality of compressible members reactively disposed between said brake plate member and said support and in engaging relationship with both thereof and yieldable axially a limited amount against an axially extending force applied against said brake plate member; a radially extending pressure plate member affixed to said clutch throwout mechanism for axial and rotative movement therewith and engageable with said brake plate member to provide a brake between said clutch throwout mechanism and said support; manually operable operating means carried by said support and connected to said clutch throwout mechanism; said operating means including releaseable means for interlocking said operating means in a plurality of positions with respect to said support and being selectively operable in one position for effecting engagement of the clutch means and disengagement of the brake and in another position for effecting disengagement of the clutch means and for locking the said pressure plate member into an engaged relation with said brake plate member against the opposing reaction of the compressible members of said resilient means.

5. A combined clutch and brake mechanism comprising, in combination: a support; a driving shaft journalled on said support; a driven shaft journalled on said support and axially aligned with said driving shaft; multiple discs clutch means between said shafts and engageable for drivingly connecting the driving shaft to the driven shaft; clutch throwout mechanism mounted on said driven shaft for rotation therewith and for slidable movement axially therealong; actuator linkage supported in part by and connected with said clutch throwout mechanism and engageable with said clutch means, and operable upon motivation by said clutch throwout mechanism for effecting the engagement and disengagement of said clutch means; said actuator linkage including locking means fashioned so that when said linkage is operated to position the clutch means into an engaged position said clutch means remains locked in such engaged position until released by operation of the locking means of said actuator linkage; a radially extending brake plate member having friction facing material on one face only thereof and circumscribing said driven shaft and carried by said support for slidable movement axially relative to said driving and driven shafts; resilient means including a plurality of compressible members reactively disposed between said brake plate member and said support and in engaging relationship with both thereof and yieldable axially a limited amount against an axially extending force applied against said brake plate member; a radially extending pressure plate member affixed to said clutch throwout mechanism for axial and rotative movement therewith and engageable with said brake plate member to provide a brake between said clutch throwout mechanism and said support; manually operable operating means rotatively carried by said support and operatively connected to said clutch throwout mechanism and including releasable interlocking means fixedly carried in part by said support and operable for fixedly positioning said operating means in any one of a plurality of positions with respect to said support; said operating means being selectively operable in one position for effecting engagement of the clutch means and disengagement of the brake and in another position for effecting disengagement of the clutch means and for fixedly positioning said pressure plate member into an engaged relation with said brake plate member against the opposing reaction of the compressible members of said resilient means.

6. A combined clutch and brake mechanism comprising, in combination: a support; a driving shaft journalled on said support; a driven shaft journalled on said support and axially aligned with said driving shaft; multiple discs clutch means between said shafts and engageable for drivingly connecting the driving shaft to the driven shaft; clutch throwout mechanism mounted on said driven shaft for rotation therewith and for slidable movement axially therealong; actuator linkage supported in part by said clutch throwout mechanism and connecting said clutch throwout mechanism with said clutch means, and operable upon motivation by said clutch throwout mechanism for effecting the engagement and disengagement of said clutch means; said actuator linkage including locking means arranged so that when said linkage is operated to position the clutch means into an engaged position said clutch means remains locked against disengagement until released by operation of the locking means of said actuator linkage; a radially extending brake plate fashioned with a plurality of peripherally spaced lugs extending radially therefrom and having a friction lining on one face only of the plate; said brake plate being disposed in circumscribing relation to said driven shaft and mounted for slidable movement axially relative to said shafts; said support having a plurality of peripherally spaced axially extending slot-like recesses formed therein and disposed to receive the lugs of said brake plate in slidable relation therewithin; resilient means including a plurality of circumferentially spaced compressible members reactively disposed between the unlined face of said brake plate and said support and in engaging relationship with both thereof and yieldable axially against an axially extending pressure applied against the lined face of said brake plate; a radially extending dish-shaped pressure plate member secured to said clutch throwout mechanism for axial and rotative movement therewith and engageable with the lined face of said brake plate member to provide a brake between said clutch throwout mechanism and said support; manually operable operating means rotatively carried by said support and operatively connected to said clutch throwout mechanism and including releasable interlocking means fixedly carried in part by said support and operable for fixedly positioning said operating means in any one of a plurality of positions with respect to said support; said operating means being selectively operable in one position for effecting engagement of the clutch means and disengagement of the brake and in another position for effecting disengagement of the clutch means and for fixedly positioning said pressure plate member into an engaged relation with the lined face of said brake plate member against the opposing reaction of the compressible members of said resilient means.

References Cited in the file of this patent

UNITED STATES PATENTS

| | | |
|---|---|---|
| 1,328,145 | Foster | Jan. 13, 1920 |
| 2,205,989 | Meyers et al. | June 25, 1940 |
| 2,269,788 | Schenk | Jan. 13, 1942 |
| 2,440,304 | Simmons | Apr. 27, 1948 |
| 2,702,106 | Strahota et al. | Feb. 15, 1955 |